April 22, 1958 W. C. EAVES ET AL 2,831,702
SPLASH GUARD
Filed Dec. 9, 1953 2 Sheets-Sheet 1
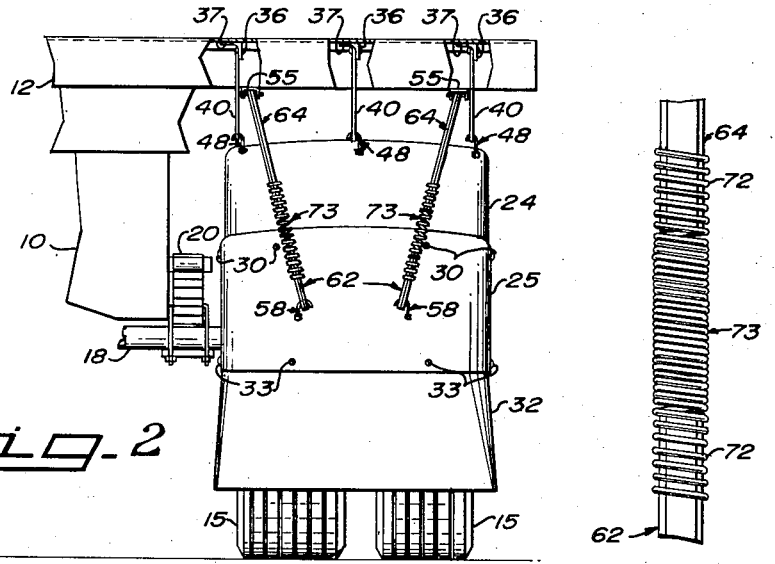
Fig. 2
Fig. 10
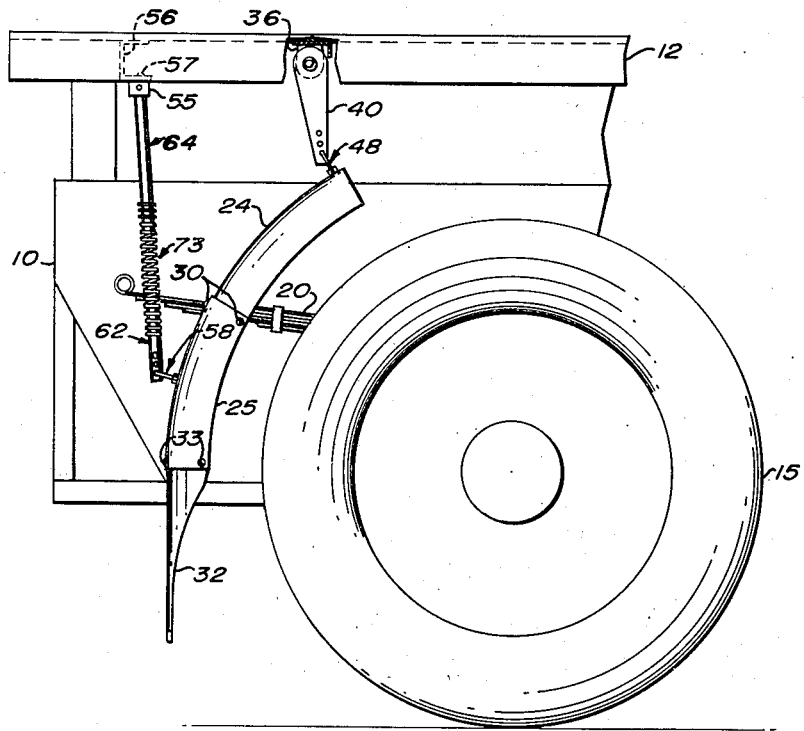
Fig. 1
INVENTORS
WILLIAM C. EAVES
WILLIAM F. ROBICHAUD
BY
Harry O. Ernsberger
ATTORNEY

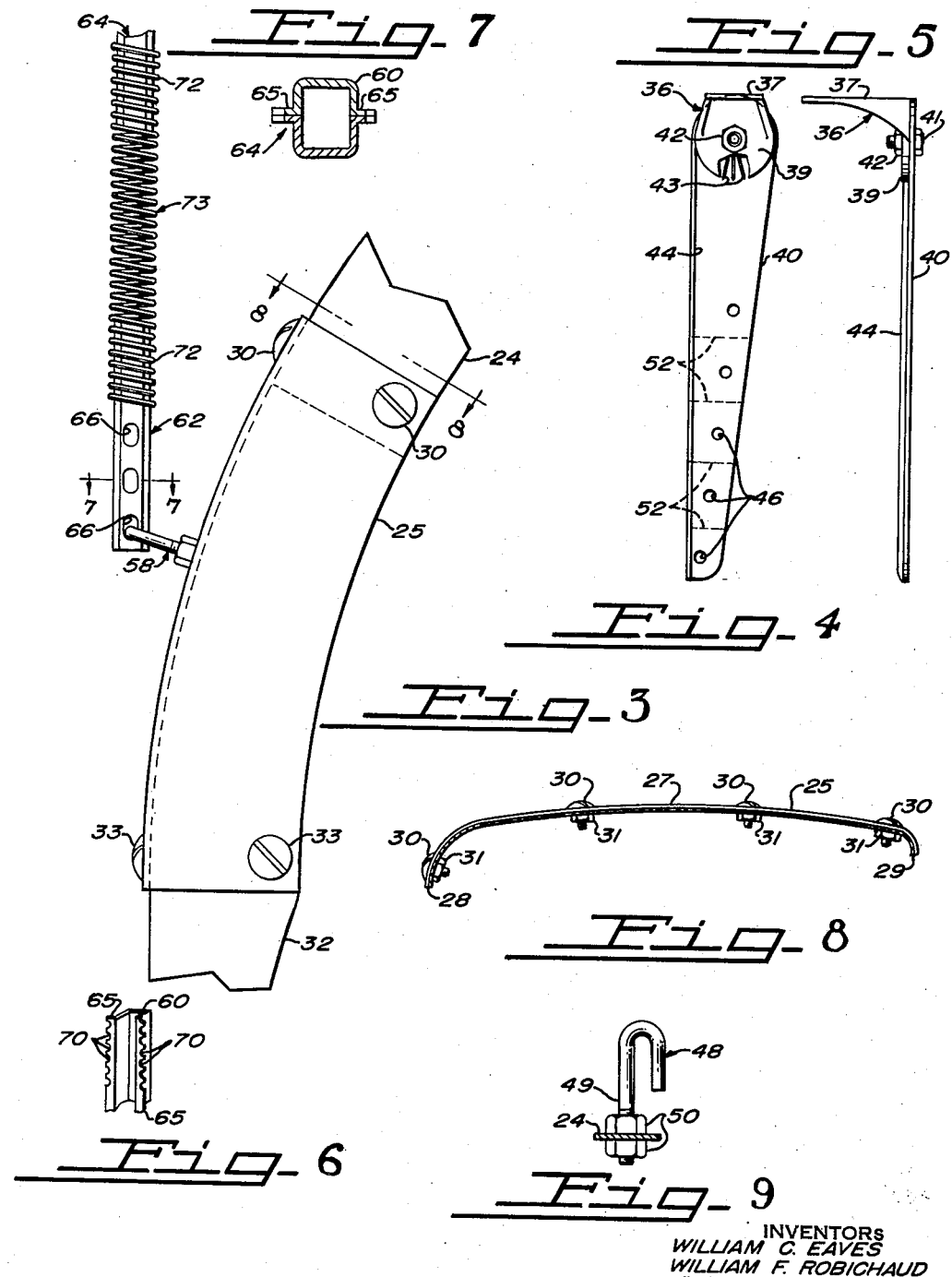

United States Patent Office 2,831,702
Patented Apr. 22, 1958

2,831,702

SPLASH GUARD

William C. Eaves, Lakewood, Ohio, and William F. Robichaud, Washington, D. C., assignors, by mesne assignments, to Contour Truck Guards, Inc., Chicago, Ill., a corporation of Delaware Application December 9, 1953, Serial No. 397,066

8 Claims. (Cl. 280—154.5)

This invention relates to splash guards, fender sections or shield for vehicles and more especially to splash guards for use with large capacity trucks, trailers, tractor-trailer vehicles and the like.

It has been conventional practice to provide splash guards or shields for the rear wheels of truck-type vehicles which are in the form of sheets of comparatively heavy rubber depending from the truck frame and disposed rearwardly of the vehicle wheels. Such splash shields have been very unsatisfactory as they are supported for free swinging movements and hence do not effectively prevent rearward splashing when the wheels of the vehicle pass through water, nor do they effectively intercept loose stones thrown from the roadway by the vehicle wheels. Moreover, such shields are readily subject to being torn when the vehicle is backed into a loading dock and the shields become pinched between the tires and the loading dock or other obstruction. Such guards are ineffective for interrupting laterally directed water or stones and are generally unsatisfactory for the intended purpose.

The present invention embraces the provision of a fender unit or splash guard for vehicles and more especially vehicles of the truck or trailer type for effectively intercepting and deflecting mud, water, loose stones and pebbles thrown from the roadway by the vehicle wheels.

An object of the invention resides in the provision of a splash guard or shield which is anchored to the vehicle frame in a manner to provide limited lateral movement or sidesway but which is mounted to facilitate substantial relative forward movement in the plane of the vehicle wheel or wheels.

Another object of the invention is the provision of a shield or splash guard for trucks, trailers and the like which is anchored for movement about a pivotal axis and resiliently supported so as to be capable of swinging movement relative to the truck so as to prevent tearing or distortion of the shield in the event the truck is backed into a loading dock or other obstruction.

Another object of the invention is the provision of a splash guard which is fabricated of metal and resilient or flexible components wherein the metal shield components are of a transverse curvature to partially embrace or overlay a portion of the vehicle wheel to aid in deflecting water and loose stones thrown from the wheel toward the roadway so as to prevent such foreign matter from being thrown against approaching or passing vehicles.

Another object of the invention resides in a supporting means for a vehicle splash guard wherein resilient means or springs are arranged in a manner to permit lateral distortion and/or longitudinal distention to provide for limited relative movement of the splash guard with respect to the vehicle to avoid damage to the arrangement in the event the vehicle is maneuvered or backed into a loading dock or other abutment.

Another object of the invention is the provision of a splash guard construction for trucks configurated or shaped so as to be adapted to fit trucks of various sizes and which is equipped with supporting means which may be adapted to various types of truck and trailer bodies, frames or chassis construction.

A further object of the invention is the provision of a splash guard or shield for trucks or the like wherein the components may be marketed in disassembled or knocked-down condition and which may be assembled and mounted on a truck without the use of special tools.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of the rear portion of a truck-type vehicle illustrating a form of the invention associated therewith;

Figure 2 is a rear elevational view of the arrangement shown in Figure 1;

Figure 3 is an enlarged elevational view of a portion of the splash guard or fender unit of the invention;

Figure 4 is an elevational view of a supporting means forming part of the invention;

Figure 5 is a side elevational view of the construction shown in Figure 4;

Figure 6 is an isometric view of a portion of a component of the construction;

Figure 7 is an enlarged fragmentary sectional view taken substantially on the line 7—7 of Figure 3;

Figure 8 is a transverse sectional view taken substantially on the line 8—8 of Figure 3;

Figure 9 illustrates a hook bolt forming a part of the construction, and

Figure 10 is a modified form of resilient support for the fender unit or splash guard.

While the invention is illustrated in association with a dual rear wheel arrangement of a truck, it is to be understood that the splash guard or fender unit of the invention may be used with various types of vehicle constructions.

Referring to the drawings in detail, there is illustrated in Figures 1 and 2 the rear portion of a truck-type vehicle which includes a chassis frame 10 upon which is supported a bed or frame portion 12 of a truck. The illustrated truck is supported upon dual wheel constructions, one such arrangement being illustrated in Figures 1 and 2, and includes dual wheels 15 which are mounted upon an axle 18 which is connected to the truck chassis frame by means of multileaf spring construction 20.

The invention is inclusive of a fender unit or splash guard arrangement for intercepting or deflecting stones, water or other foreign matter projected rearwardly from the wheels of the vehicle. The construction as disclosed is inclusive of fender or splash guard sections 24 and 25 which are preferably formed of metal and of identical shape. Each of the sections is of a cross-sectional configuration as shown in Figure 8, each section including a central body portion 27 of shallow curvature terminating at one edge in a curved flange portion 28, the other edge zone terminating in a flange 29 which is shorter than the flange 28. The sections 24 and 25 are preferably formed of sheet metal and hence have a certain degree of flexibility, enabling one section to be telescoped or overlapped a short distance with the other section as particularly shown in Figures 3 and 8, the overlapping portions of the sections being joined together by means of bolts 30 which extend through registering openings in the sections and are provided with securing nuts 31. The downwardly turned flange portions 28 and 29 serve to lend rigidity to the sections 24 and 25, the flange 28 forming a skirt to aid in intercepting or deflecting particles or water spray projected laterally from the tread of the vehicle wheels.

The metal section 25 terminates a substantial distance above the roadway as shown in Figures 1 and 2. An extension or shield 32 is provided attached to the section 25 by means of securing bolts 33. The section or apron 32 of the assembly is preferably fashioned of a flexible or pliable material, such as rubber, synthetic rubber or the like, so that under the impact of flying stones the section or shield 32 will be flexed and will not be subject to injury.

The splash guard or fender unit assembly is carried by the frame of the vehicle in a manner to provide for limited relative movement of the assembly. Secured to the vehicle chassis or body adjacent the forward extremity of the section 24 is a supporting or anchoring means which includes a plurality of brackets 36, each having a transversely extending portion 37 adapted to be secured to the vehicle body by means of bolts, by welding or other suitable securing means. Each of the brackets is provided with a depending, substantially circular portion 39 to which is secured an arm 40 by means of a bolt 41 and a securing nut 42. The faces or surfaces of the cooperating portions of the brackets 36 and arms 40 are preferably provided with radially arranged serrations or ridges 43 shown in Figure 4 to hold the arms 40 in adjusted position relative to the brackets 36. Thus, by backing off the nuts 42 from the bolts 41, the arms 40 may be adjusted about the axes of the bolts 41 to properly position the splash guard assembly with respect to the wheels 15. Each of the arms 40 is preferably formed with a longitudinally extending reinforcing rib or flange 44 to impart rigidity to the arm.

Each of the arms 40 is preferably formed with a series or plurality of openings 46, one of which is engaged by a hook bolt 48 of the character shown in Figures 1, 2 and 9. The shank portion 49 of the hook bolt 48 is threaded to accommodate securing nuts 50. As shown in Figure 2, the splash guard assembly is anchored or supported by three units, each unit including a bracket 36, an arm 40, and a hook bolt 48. The threaded shanks 49 of the hook bolts 48 are disposed in openings in the splash guard section 24 and are equipped with securing nuts 50, the splash guard assembly being anchored for pivotal movement about the axes of the hook bolt portions engaging the arms 40. The hook bolts may be adjusted relative to the section 24 by manipulating the securing nuts 50.

The arrangement of the invention is especially adaptable for various types and sizes of truck frames and chassis designs. In order to render the support arrangement adaptable for different heights of chassis or frame construction, the arms 40 may be cut to proper length as desired by severing the arms at one of the zones indicated in dotted lines at 52 between adjacent openings 46 as may be required to properly position the forward zone of the splash guard assembly above the road wheels.

Means is also provided for resiliently maintaining the splash guard or fender unit assembly in a predetermined position relative to the truck wheels and body construction and providing for relative pivotal movement of the splash guard assembly when the assembly is subjected to stress or strain or under the impact of flying objects. Disposed rearwardly of the brackets 36 is a pair of U-shaped clips or members 55 which may be secured to a frame member 56 of the truck body or chassis by means of rivets 57 or other securing means. The splash guard section 25 is also provided with openings to receive a pair of hook bolts 58 of the same general construction as the hook bolt 48 shown in Figure 9. The clips 55 and hook bolts 58 are joined or connected by an arrangement including a resilient means. This connecting arrangement is inclusive of two pairs of sheet metal elements 60, each of U-shaped cross section, one pair of elements forming a bar-like construction or unit 62 which is adapted for connection with a hook bolt 58, another pair of the sheet metal elements 60 forming a bar or bar unit 64 which is adapted for pivotal connection with one of the U-shaped clips 55.

Each of the sheet metal elements 60 is formed with transversely extending flange portions or members 65 which mate with the flange portions formed on the adjacent section 60. The web portions of the members 60 forming the bar unit 62 are formed with elongated openings 66, one set of openings being arranged to accommodate the hook portion of the hook bolt 58 which is formed with a bight portion shaped to pass through a set of openings in the members of the bar unit. The series of slots 66 are provided so that the hook bolt 58 secured to the splash guard assembly may be interengaged in the proper set of openings 66 to dispose the splash guard with respect to the chassis or body of the truck to secure the most effective position for the splash guard assembly relative to the road wheels.

The transverse flanges 65 of each pair of sheet metal members 60 are provided with spaced recesses 70 as shown in detail in Figure 6, spaced or pitched apart a sufficient distance to provide a rack-like configuration to receive a portion 72 of a coil spring 73. It should be noted that the bar units 62 of each pair are normally aligned but are spaced substantially as illustrated in Figure 3, the gap being bridged by an intermediate zone of the coil spring 73. The ends zones of spring 73 are threaded upon the notched or recessed portions of the bar units 62 and 64 so that the recesses 70 are occupied by the convolutions of the spring. The serrations 70 in the flanges of the bar units form in effect, a threaded means which, when engaged by the portions 72 of the spring 73, hold the bar units 62 and 64 in spaced relation and secure the sections 60 of each bar unit together. When the supporting units comprising bars 62, 64 and springs 73 are assembled and the outer ends of the bar units connected with the clips 55 and the hook bolts 58 in the manner illustrated in Figures 1 and 2, the coil springs 73 are restricted against displacement by reason of the portions of the spring occupying the recessed zones of the bar units 62.

Through this arrangement a resilient means is provided for supporting the fender or splash guard unit so that the unit is adapted for pivotal movement about the zones of the hook bolts 48 passing through openings 46 in the depending supporting bars 40. In the event that the vehicle is backed into a loading dock or in any position wherein one of the splash guard sections engages an abutment and is forced toward contact with the tread of the wheels 15, the intermediate zone of the spring 73 will be flexed or distended, allowing the fender assembly to move forwardly and downwardly relative to the vehicle, thus avoiding damage to the fender or splash guard sections.

As shown in Figures 1, 2 and 3, the intermediate zone of the spring between the bars 62 and 64 is of substantially the same pitch as the portions of the spring in threaded engagement with the bars 62 and 64 so that the fender or splash guard assembly is resiliently supported in a manner capable of limited swinging movements about the hook bolts 48 in both directions. In certain installations it may be desirable to avoid movement of the splash guard or fender sections in one direction. This may be accomplished by fashioning a spring 73' in the manner shown in Figure 10. In this form of construction the end zones 72' of the spring are threaded into recesses formed on the bar units 62' and 64' in the manner hereinbefore described in the form of construction shown in Figures 1, 2 and 3. The intermediate or central zone of the spring 73' between the bar units may be formed with closed convolutions in the manner shown in Figure 10, the closed convolutions forming a substantially rigid abutment means preventing swinging movement of the splash guard or fender assembly in a rearward direction. The intermediate zone of the spring 73' is capable of being extended or flexed to permit swinging movement of the fender or splash guard assembly in a direction forwardly of the vehicle.

It will be apparent that the arrangement of the invention provides an effective splash guard or shield arrangement for installation on trucks and that the mounting components of the assembly are configured to be mounted on various sizes of trucks and various types of vehicle frame construction. The pivotal adjustment of the arms 40 makes possible the anchoring of the forward end of the section 24 in a most effective position irrespective of the size of road wheels of the vehicle and the resilient supporting means connected with the section 25 may be accommodated to road wheels of various sizes by severing the lowermost bar unit 62 to a desired length so that the hook bolt 58 engages a proper pair of openings or slots 66 in the bar unit components 60 to conform the splash guard sections 24 and 25 to the curvature of the tread of the road wheels 15. The components of the arrangement of the invention in disassembled condition may be packaged in compact form for shipment and may be easily installed on any truck construction without the use of special tools.

It is apparent that, within the scope of the invention, modifications and different arrangements may be made other than is herein disclosed, and the present disclosure is illustrative merely, the invention comprehending all variations thereof.

We claim:

1. A splash guard assembly for a vehicle having a frame including, in combination, a plurality of guard sections, means for securing the sections together, a series of hook bolts carried by each of said sections, a plurality of mounting brackets associated with the frame, members connecting one series of hook bolts with said mounting brackets, a plurality of clips associated with the frame, connecting means joining the other series of hook bolts with said clips, said connecting means including a spring for resiliently maintaining said guard sections in predetermined position.

2. A splash guard assembly for a vehicle having a frame including, in combination, a plurality of metal guard sections arranged in overlapping relation, means for securing the sections together at the overlapping zone, a plurality of hook bolts carried by one of said sections, a plurality of mounting brackets secured to the frame, means connecting said hook bolts with said mounting brackets, a mounting clip secured to the frame, and means joining another of the sections with said clip, said joining means including a pair of bar units and a coil spring disposed between and connected with each of said bar units for yieldingly maintaining said guard sections in predetermined position.

3. A splash guard assembly for a vehicle having a frame including, in combination, a plurality of metal guard sections, means for securing the sections together, a series of hook bolts carried by each of said sections, a plurality of mounting brackets carried by the frame, means connecting one series of hook bolts with said mounting brackets, a plurality of mounting clips carried by the frame, connecting means joining the other series of hook bolts with said mounting clips, said connecting means including a pair of bar units and a coil spring disposed between and connected with each of said bar units for resiliently maintaining said guard sections in predetermined position, and a skirt of flexible material secured to and depending from one of said metal guard sections.

4. A splash guard assembly for use on a vehicle having a frame including, in combination, a pair of overlapping convexly curved metal sections, means for securing said sections together, means for supporting one of said sections from the frame for pivotal movement relative thereto, a mounting clip adapted to be secured to the frame, means joining said clip and the other of said sections including bar-like units, each of said units including pairs of matched U-shaped sheet metal members, said U-shaped members of each pair having laterally extending mating flanges, serrations formed in said flanges, and a coil spring joining the units, the convolutions of the end zones of the coil spring being threaded into the recesses in said mating flanges for resiliently supporting said splash guard sections.

5. A splash guard assembly for use on a vehicle having a frame including, in combination, a pair of overlapping convexly curved metal sections arranged in overlapping relation, means for securing the overlapping portions together, a series of hook bolts carried upon each of said sections, a plurality of brackets adapted to be secured to the frame of a vehicle, an arm connected to each of said brackets and adapted for adjustment relative thereto, said arms being connected with the hook bolts carried by one of said sections, a plurality of mounting clips adapted to be secured to the frame, connecting units joining each of said clips with a hook bolt carried by the other of said sections, said connecting units including pairs of mating U-shaped sheet metal members, each of said U-shaped members having laterally extending flanges, serrations formed in said flanges, a coil spring joining the units of U-shaped sheet metal members, convolutions of the end zones of the coil spring being threaded into the recesses in said flanges, and an extension formed of flexible material depending from one of said sections.

6. A splash guard assembly for use on a vehicle having a frame including, in combination, a pair of overlapping convexly curved metal sections arranged in overlapping relation, means for securing the overlapping portions of said sections together, a series of hook bolts carried upon each of said sections, a plurality of brackets adapted to be secured to the frame of a vehicle, an arm connected to each of said brackets and adapted for adjustment relative thereto, said arms being connected with the hook bolts carried by one of said sections, a plurality of clips adapted to be secured to the frame of a vehicle, connecting units joining each of said clips with a hook bolt carried by the other of said sections, each of said connecting units including a pair of U-shaped sheet metal members, each of said U-shaped members having laterally extending flanges, serrations formed in said flanges, and a coil spring joining pairs of U-shaped sheet metal members, the convolutions of the end zones of the coil spring being threaded into the recesses in said flanges.

7. A splash guard construction for use with a vehicle having a frame including, in combination, a plurality of interconnected guard sections, each of said sections being curved in a longitudinal direction and having their lateral edge regions bent downwardly forming transversely spaced flanges, a first set of braces pivotally secured to the outer side of the uppermost guard section at substantially the edge of the upper end thereof, said braces projecting upwardly and away from the said outer surface for securement to the frame of said vehicle overlying said guard sections, and a second set of braces pivotally secured to the outer surface of an intermediate guard section adapted to be secured to said vehicle frame at a position spaced from said first set of braces, said second set of braces extending from said intermediate splash guard section in substantially parallel relationship with said first set of braces.

8. A splash guard construction as in claim 7 and wherein said upper and intermediate sections of said plurality of sections are metallic and wherein the lowermost guard section is a flexible non-metallic section.

(References on following page)

References Cited in the file of this patent

UNITED STATES PATENTS

| | | |
|---|---|---|
| 1,719,646 | Blair | July 2, 1929 |
| 2,038,234 | Olen | Apr. 21, 1936 |
| 2,311,941 | Gustafson | Feb. 23, 1943 |
| 2,405,262 | Lindsay | Aug. 6, 1946 |
| 2,414,676 | Taurman et al. | Jan. 21, 1947 |
| 2,591,196 | Post | Apr. 1, 1952 |
| 2,605,119 | Earnest | July 29, 1952 |
| 2,660,453 | Russell et al. | Nov. 24, 1953 |
| 2,679,403 | Howard et al. | May 25, 1954 |
| 2,699,955 | Eaves et al. | Jan. 18, 1955 |